US006576144B1

(12) United States Patent
Vineyard

(10) Patent No.: US 6,576,144 B1
(45) Date of Patent: Jun. 10, 2003

(54) METHOD AND APPARATUS FOR PRETREATMENT OF WASTEWATER STREAMS BY CHEMICAL OXIDATION

(75) Inventor: Mark K. Vineyard, Houston, TX (US)

(73) Assignee: MPR Services, Inc., Dickinson, TX (US)

( * ) Notice: Subject to any disclaimer, the term of this patent is extended or adjusted under 35 U.S.C. 154(b) by 0 days.

(21) Appl. No.: 09/902,747

(22) Filed: Jul. 12, 2001

(65) Prior Publication Data (65)

(51) Int. Cl.[7] .................................................. C02F 1/72
(52) U.S. Cl. .................. 210/758; 210/759; 210/760; 210/763; 210/175; 210/199; 210/909
(58) Field of Search .................. 210/758, 759, 210/760, 763, 85, 175, 199, 260, 908, 909

(56) References Cited

U.S. PATENT DOCUMENTS

| | | | |
|---|---|---|---|
| 3,617,567 A | 11/1971 | Matbre | |
| 3,878,208 A | 4/1975 | Carlson et al. | |
| 3,909,395 A | 9/1975 | Takacs | |
| 4,108,771 A | 8/1978 | Weiss | |
| 4,263,136 A | 4/1981 | Gagliardi et al. | |
| 4,292,293 A | 9/1981 | Johnson et al. | |
| 4,347,225 A | 8/1982 | Audeh et al. | |
| 4,347,226 A | 8/1982 | Audeh et al. | |
| 4,350,599 A | 9/1982 | Chowdhury | |
| 4,443,342 A | 4/1984 | Stas et al. | |
| 5,246,597 A | 9/1993 | Jenson et al. | |
| 5,354,482 A | 10/1994 | Varadi | |
| 5,360,552 A | * 11/1994 | Yan | |
| 5,434,329 A | 7/1995 | Lehr | |
| 5,891,346 A | 4/1999 | Huntley | |
| 5,948,275 A | 9/1999 | Djafer et al. | |
| 6,361,697 B1 | * 3/2002 | Coury et al. | |

OTHER PUBLICATIONS

Yi–Shou Chen, *Spent Caustic Treatment and Disposal*, Proceedings of the 42nd Industrial Waste Conference, May 12, 13, 14, 1987, 429–436.

William H. Kibbel, Jr., *Peroxide Treatment For Industrial Waste Problems*, Ind. Water Eng., 4, 6, (1976).

C. Walling et al., *Fenton's Reagent. IV. Structure and Reactivity Relations in the Reactions of Hydroxyl Radicals and the Redox Reactions of Radicals*, J. Aus. Chem. Sec., 96(1), 133–39 (1974).

C. Walling, *Fenton's Reagent Revisited*, Accounts of Chem. Res., 2, 125–131 (1974).

M.R. Hoffman, *Kinetics and Mechanism of Oxidation of Hydrogen Sulfide by Hydrogen Peroxide in Acidic Solution*, Enviro. Sci. Tech., 11, 61, (1977).

K.V. Chen et al., *Kinetics of Oxidation of Aqueous Sulfide by $O_2$*, Enviro. Sci. & Tech., 6, 6, 529, (Jun. 1972).

H.R. Eisenhauer, *Oxidation of Phenolic Wastes*, Journal WPCF, Sep. 1984, 1116–1128.

E.J. Keating, et al., *Phenolic Problems Solved With Hydrogen Peroxide Oxidation*, Industrial Water Engineering, vol. 15, No. 1, p.22, (Dec. 1978).

S.L. Cosgrove et al., *The Oxidation of Phenols with the Free Hydroxyl Radical*, JCS (London), pp 2422–2433 (1943).

K.L. Shanahan, *The Effect of $Fe^{3+}$, $Cr^{3+}$, $Ni^{2+}$, and $Mn^{2+}$ Ions on Decomposition of Hydrogen Peroxide Solutions*, Energy Res. Abstr., vol. 21, No. 10, 15pp, (1979).

H. Golnick, et al., *Complexed Iron Catalysis of Hydrogen Peroxide Reactions*, Solvay Interox R&D Lab, May 23, 1997.

* cited by examiner

Primary Examiner—Betsey Morrison Hoey
(74) Attorney, Agent, or Firm—Banner & Witcoff, Ltd.

(57) ABSTRACT

Spent caustic and other wastewater streams are pretreated by continuous chemical oxidation. According to one aspect, a wastewater stream is pretreated by continuous chemical oxidation in a plug flow reactor. According to another aspect, a catalyst and an oxidizer are fed into a wastewater stream at first and second predetermined points of addition. Compounds in the wastewater stream susceptible to chemical oxidation are reacted with the chemical oxidizer. A modular, optionally fully automated apparatus is provided for pretreating spent caustic and other wastewater streams.

22 Claims, 1 Drawing Sheet

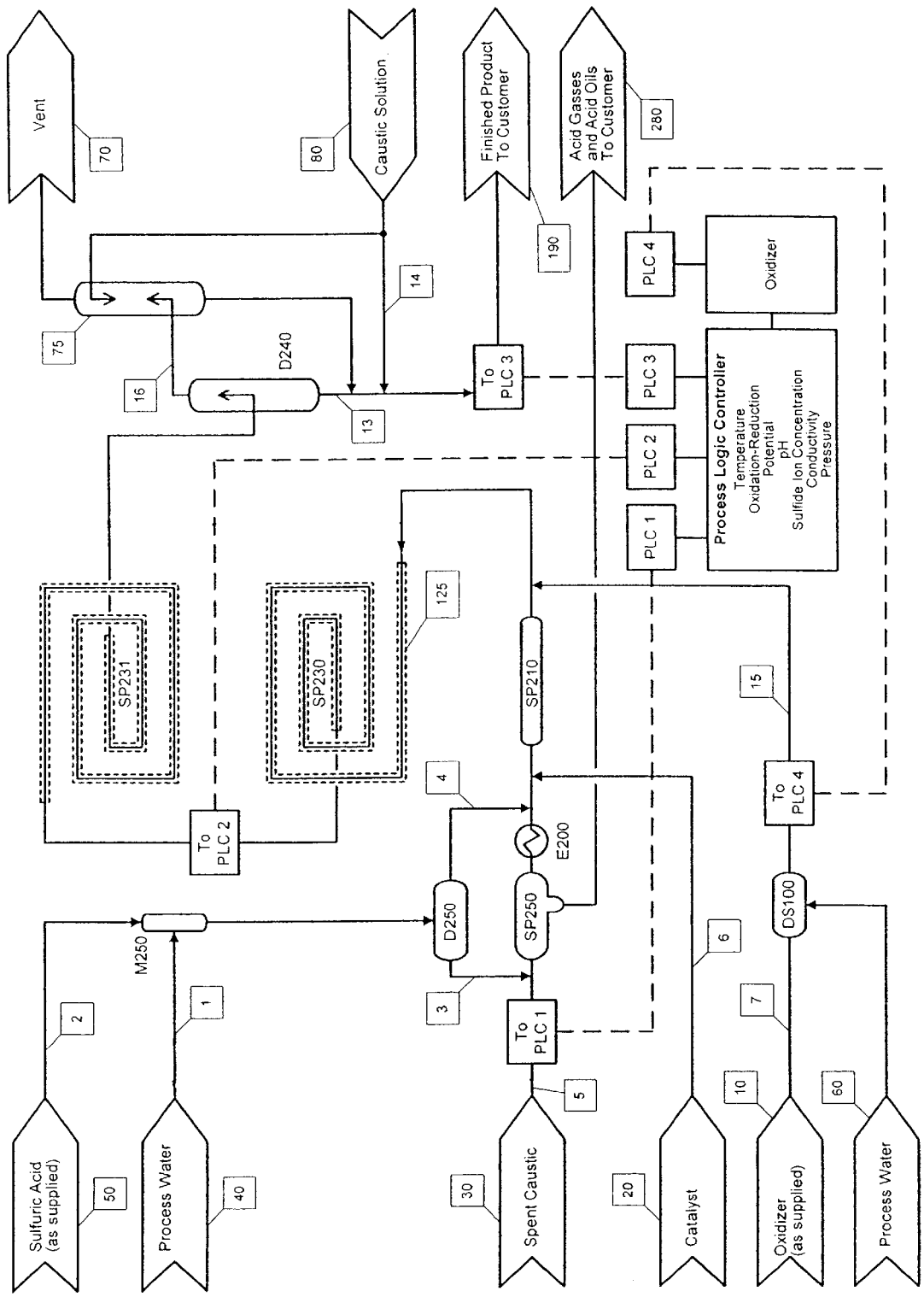

METHOD AND APPARATUS FOR PRETREATMENT OF WASTEWATER STREAMS BY CHEMICAL OXIDATION

BACKGROUND OF THE INVENTION

1. Field of the Invention

The present invention is directed to the pretreatment of wastewater streams by chemical oxidation, more particularly to the pretreatment of spent caustic streams containing sulfidic, phenolic, cresylic, and/or naphthenic compounds.

2. Description of Related Art

In petroleum refining and in petrochemical processing, hydrocarbon conversion products often are scrubbed with caustic solution. In petrochemical processing, for example, such scrubbing removes hydrogen sulfide and carbon dioxide primarily as sodium sulfide, sodium carbonate and sodium bicarbonate, and also removes some of the higher molecular weight hydrocarbon constituents. Caustic solution can be used to remove naphthenic acids and other organic acids, as well as other sulfur compounds from cracked petroleum products and petroleum distillate. However, because caustic solutions are quite harmful to organic tissue, extreme care must be taken in the use and disposal of the spent caustic solutions to protect waterways, rivers, subterranean water formations, and the like. Such spent caustic solutions often are unsuitable for direct treatment in biological wastewater treatment plants because of such factors as high pH and incompatibly high levels of biochemical oxygen demand (BOD), chemical oxygen demand (COD), and total organic carbon (TOC).

Several methods have been proposed to dispose of spent caustic. Among these are wet air oxidation, chemical oxidation, and incineration. In conventional incineration processes, combustion of a fuel oil and natural gas sustains the evaporation of the aqueous parts of the waste liquor, yielding carbon dioxide and alkali metal carbonates. One major drawback with conventional incineration is that fuel oil and natural gas are relatively expensive fuel sources, especially in view of the substantial quantities of spent caustic generated during petroleum refining and petrochemical processing requiring treatment.

In Wet Air Oxidation (WAO), gaseous oxygen in the form of fine bubbles is contacted with spent caustic in contacting columns for relatively long residence times. Many devices employ steam injection as well as gas/liquid contacting devices and co-current and counter-current arrangements, with or without catalysts. One example of a WAO process is described in U.S. Pat. No. 5,891,346 to Huntley. A sulfide-containing alkaline aqueous effluent is subjected to an oxidation treatment that oxidizes sulfide ions to environmentally acceptable sulfur acid ions. The oxidation is carried out in two or more chambers connected in series. WAO processes suffer from several drawbacks, including the requirement of large capital expenditures.

Various forms of chemical oxidation also have been proposed for treating spent caustic solutions. One example is U.S. Pat. No. 5,246,597 to Jenson et al., which describes a two-step process of chemically oxidizing sulfides, such as those found in sour water from an ethylene plant, to their sulfate state. The sulfide-containing sour water is sequentially contacted with two oxidizers, hydrogen peroxide and chlorine dioxide. According to Jenson, once the sulfide is oxidized to the sulfate state, the pH of the sour water can be adjusted through addition of acids without danger of hydrogen sulfide being released into the atmosphere. The sulfates are said to remain in a water-soluble form after treatment, and optionally are subjected to further treatment. Although Jenson reports costs savings over the use of either oxidizer alone, the process is rather complex and requires close supervision.

There remains a need for a more efficient and cost effective method of pretreating spent caustic and other wastewater streams. It would be especially desirable to develop a continuous process capable of handling a wide variety of wastewater stream components as well as a wide variety of oxidizers, especially one that can be operated under a wide variety of process conditions with minimal human intervention.

SUMMARY OF THE INVENTION

According to a preferred embodiment of the present invention, a wastewater stream containing one or more compounds susceptible to treatment by chemical oxidation is pretreated by continuous chemical oxidation in a plug flow reactor. A chemical oxidizer is mixed with the wastewater stream to form a reactive mixture. The reactive mixture is flowed through a plug flow reactor suitable for reacting the compound(s) susceptible to chemical oxidation with the chemical oxidizer.

According to another preferred embodiment of the invention, a wastewater stream containing one or more compounds susceptible to treatment by chemical oxidation is continuously pretreated by chemical oxidation. A catalyst is fed into the wastewater stream at a first predetermined point of addition and mixed with the wastewater stream. A chemical oxidizer is fed into the wastewater stream at a second predetermined point of addition, which can be downstream or upstream of the first point of addition, and mixed with the wastewater stream. The compound(s) susceptible to chemical oxidation is/are reacted with the chemical oxidizer.

According to another aspect of the invention, a modular apparatus is provided for continuously pretreating a wastewater stream by chemical oxidation in a plug flow reactor. A modular unit contains means for flowing a wastewater stream and means for feeding a chemical oxidizer into the wastewater stream. The modular unit further contains a plug flow reactor suitable for reacting oxidizable compound(s) in the wastewater stream with the chemical oxidizer.

The modular apparatus optionally contains one or more modules for: (a) feeding a pH adjusting medium into the wastewater stream at one or more points of addition; (b) scrubbing vent gases present in the wastewater stream; (c) feeding a catalyst into the wastewater stream; and (d) separating acid gas and acid oil from the wastewater stream. In addition, the apparatus optionally (though preferably) includes control means for monitoring such conditions as pH, temperature, sulfide ion concentration, and/or oxidation-reduction potential of the wastewater stream at one or more locations in the apparatus. In response to the monitored conditions, parameters such as pH, temperature, pressure, chemical oxidizer flowrate, and catalyst flowrate can be automatically adjusted, as needed, to avoid or minimize the need for operation intervention.

BRIEF DESCRIPTION OF THE DRAWING

The present invention will now be described in more detail with reference to preferred embodiments of the invention, given only by way of example, and illustrated in the accompanying drawing in which:

The FIGURE is a process flow diagram for plug flow chemical oxidation using a modular apparatus in accordance with a preferred embodiment of the invention.

DETAILED DESCRIPTION OF THE INVENTION

The present invention will be described hereinafter primarily with reference to the pretreatment of spent caustic solutions. It should be understood that the present invention is useful for the treatment of a wide variety of wastewater streams, including, for example, various solutions employed in industrial scrubbing or washing processes. Non-limiting examples of such solutions include sodium hydroxide, potassium hydroxide, calcium hydroxide, ammonium hydroxide, sour water and other alkaline solutions. In general, the present invention has utility for the treatment of any wastewater solution having one or more compounds susceptible to treatment by chemical oxidation. A compound "susceptible to treatment by chemical oxidation" refers to any compound for which chemical oxidation, with or without additional treatments, would render a wastewater stream containing the compound less odorous, less toxic, and/or otherwise more suitable for or compatible with processing in a biological wastewater treatment plant or other downstream processing.

In most cases, a step of final polishing of the pretreated wastewater stream will be performed at a biological wastewater treatment plant as a last step before being discharged to the receiving watershed. Final polishing ensures that pretreated stream is compatible with the treatment plant's influent and that prerequisite conditions are met to avoid a plant upset. Many wastewater streams contain a variety of volatile noxious and toxic compounds that can be transformed into less odorous, less toxic, and more environmentally compatible products through chemical oxidation. As will be apparent to persons skilled in the art, the operating conditions as well as the particular treatments used in the practice of the present invention will largely depend on the composition of the wastewater stream and on compatibility requirements for downstream processing. For typical treatments, odor abatement is a primary objective, followed by toxicity reduction. In some cases, it also may be necessary to further reduce carbonaceous loading and oxygen demand. Such loading characteristics are commonly defined using empirical tests including chemical oxygen demand (COD), biochemical oxygen demand (BOD), total organic carbon (TOC), oil and grease, and the like. In addition to these loadings, an array of specific chemical tests can be employed, including without limitation total sulfides, permanganate demand, acid oils, metals, and specific gravity. In addition, gas chromatography/mass spectrometry (GC/MS) scans can be used to determine the presence and relative concentrations of specific compounds.

Table 1 summarizes precursor family groups, typical concentration ranges, and other solution characteristics typically encountered in spent caustic solutions to be pretreated. It should be understood that the identified precursors are meant to be illustrative rather than exhaustive. Similarly, the identified concentration ranges should be regarded as illustrative rather than as limiting the scope of the present invention. It is contemplated that, in some cases, the identity and/or concentration of particular components in spent caustic or other wastewater streams may deviate significantly from those illustrated in Table 1.

TABLE 1

Spent Caustic Precursor Family Groups

| Precursor Family or Solution Characteristic | Impact of Precursor or Solution Characteristic | Typical Concentration Range |
| --- | --- | --- |
| Sulfidic | Strong Odors, High Loading, Extremely Toxic | 500 to 80,000 mg/L |
| Sour Water | Strong Odors, High Loading, Extremely Toxic | 100 to 10,000 mg/L |
| Mercaptanic | Strong Odors, High Loading, Highly Toxic | 50 to 40,000 mg/L |
| Disulfidic | Strong Odors, High Loading, Highly Toxic | 50 to 40,000 mg/L |
| Phenolic | Moderate Odors, High Loading, Extremely Toxic | 50 to 100,000 mg/L |
| Cresylic | Strong Odors, High Loading, Moderately Toxic | 50 to 100,000 mg/L |
| Naphthenic | Strong Odors, High Loading, Low Toxicity | 50 to 100,000 mg/L |
| Acid Oils, extractable | Strong Odors, High Loading, Extremely Toxic | 1 to 75% w/v |
| Ammonia, Low Concentrations | Low Odors, Moderate Loading, Low Toxicity | 25 to 1,000 mg/L |
| Ammonia, High Concentrations | High Odors, High Loading, High Toxicity | 15,000 mg/L + |
| Alkalinity | No Odors, High Loading, Low Toxicity | 2 to 20% w/w |
| PH | No Odors, High Loading, Low Toxicity | 8.5 to 14 |

Although precursors to alkalinity and pH (such as hydroxides, carbonates, and bicarbonates) generally are not toxic or odorous, such precursors nevertheless often need to be neutralized prior to final polishing in wastewater treatment plants. In the case of ammonia, high ammonia concentrations may be encountered in sour waters and the like. Because chemical oxidation of ammonia can be unpredictable with many oxidizers, it may be advantageous to use breakpoint chlorination, as needed, to reduce ammonia levels. The remaining precursor family groups listed above in Table 1 are discussed more fully below.

Sulfides, mercaptans, disulfides, and other volatile compounds in spent caustic solutions typically exhibit noxious odors and toxicity characteristics. Sulfides are present in most spent caustic solutions. One example of sulfide oxidation is the transformation of the first oxidation level of volatile hydrogen sulfide into elemental sulfur, or into other oxidation states such as sulfates, thiosulfates, dithionates, and the like. Reaction conditions can be preselected to influence the resulting oxidation state. For example, under light oxidation conditions, mercaptans form disulfide oils that can be easily separated and can be returned back to the refinery as valuable products. More aggressive oxidation conditions can be used to promote further transformation, e.g., into sulfonates, if needed or desired.

Phenolics and cresylics are examples of semi-volatile, aromatic, toxic compounds for which a principal goal, in addition to odor abatement, is to cleave the aromatic ring to form non-toxic, aliphatic products such as carboxylic acids, glycols, ketones, and the like. Secondary oxidation states involve further cleavage of the aliphatic products into shorter chain compounds, and ultimate transformation to carbon dioxide.

Naphthenics are a separate category of semi-volatiles that generally exhibit lower toxicity compared to other spent caustic precursors. A principal goal in the treatment of naphthenics, in addition to odor abatement, is to reduce the carbonaceous loading and oxygen demand characteristics, e.g., total organic carbon (TOC), chemical oxygen demand (COD) and biochemical oxygen demand (BOD). Ultimate transformation to carbon dioxide generally is not necessary unless the receiving biological wastewater treatment plant requires further reductions in TOC.

Acid oils include organics that separate at various pH conditions, typically below a pH of about 12. "Light" acid oils include those extracted at a pH of about 7, "soft" acid oils at a pH of about 4, and "hard" acid oils at a pH of about 2. Cresylic and phenolic acid oils usually separate at a pH of about 7 and about 4, respectively, while naphthenics separate at a pH of about 2. Key advantages of extracting and removing acid oils prior to oxidation include resource recovery, reduced oxidation chemical costs, and reduced loading to the receiving biological wastewater treatment plant.

A wide variety of oxidizers can be used in the practice of the invention. Non-limiting examples include hydrogen peroxide, potassium permanganate, ozone, oxygen, chlorine dioxide, Caro's Acid, chlorine and sodium hypochlorite. Two or more oxidizers can be used, such as in a synergistic combination, e.g., ozone and hydrogen peroxide. A preferred oxidizer for use in the practice of the invention is hydrogen peroxide, for both economic and performance considerations. Hydrogen peroxide can be supplied in any suitable form, e.g., by diluting a 50 wt % aqueous solution to about 2–10 wt %.

Preferably, a catalyst is used for maximum efficiency of the oxidation reactions. Any suitable oxidation catalyst can be used, non-limiting examples of which include the various oxidation states of copper, nickel, titanium, vanadium, molybdenum, cobalt, aluminum, tungsten, iron, manganese, and silicon. Of these, iron, manganese, and silicon are preferred for most wastewater treatment applications due to environmental concerns. The particular catalyst will depend on such factors as the type of oxidizer used. When using hydrogen peroxide as the oxidizer, a preferred catalyst is ferrous sulfate (copperas), which contains active $Fe^{2+}$ ions that generate hydroxyl free radicals from the reaction with the peroxide. Ferrous sulfate catalyst solutions are available, for example in commercial grade, 5.2 wt % as Fe.

The catalyst optionally is complexed with a suitable complexing agent, such as ethylenediaminetetraacetic acid (EDTA), to provide better control of the oxidation reactions. Ferrous sulfate complexed with EDTA, for example, is known to improve the performance of certain hydrogen peroxide reactions. During reaction with spent caustics, the oxidation reaction rate is controllable as a function of the ratio complexing agent to catalyst (and oxidizer), thus allowing the initial heat of reaction to be removed more efficiently over a longer period of time.

The process will now be described with reference to a preferred embodiment of the present invention illustrated in the Figure, given only by way of example. A supply of spent caustic 30 is delivered through a feed line 5. The spent caustic wastewater stream may be received on-line from the refinery or other user to avoid or minimize the need for storage. The flowrate of the incoming wastewater stream can vary over a wide range. Typical flowrates of the incoming spent caustic wastewater stream range from about 1–5 gallons/minute, more usually often from about 2–3 gallons/minute. Alternatively, the wastewater stream can be pumped in whole or in part from storage tanks or the like.

In a preferred embodiment of the invention, the spent caustic wastewater stream is subjected to one or more pH adjustments. Although pH adjustments are not necessary in the practice of the invention, it often is advantageous to adjust pH, e.g., to improve efficiency and/or cost effectiveness of the oxidation reactions. For example, lower pH conditions generally favor the oxidation reactions, so that a lower amount of oxidizer can be used. The extent of the pH adjustment(s) will depend on such factors as the composition and properties of the spent caustic as well as the particular objectives of the pretreatment. For example, in cases where acid oils are separated and recovered from the spent caustic, pH can be lowered to 7, 4, or 2, depending on the type of acid oil recovery (as discussed above). Without the optional acid oil separator SP250, it may be desirable to neutralize the bulk of the alkalinity, e.g., to a pH of about 10.

As illustrated in the Figure, a concentrated (typically about 92 wt %) supply 50 of sulfuric acid is fed through line 2 and combined with process water 40 fed through line 1, in a coriolis mixer M250 to prepare sulfuric acid, typically at a concentration of from about 2 to about 20 wt %. The sulfuric acid can be stored in and pumped, as needed, from a drum D250. The first pH adjustment can be affected by pumping sulfuric acid through line 3 and into the spent caustic line 5. A heat exchanger E200 optionally is provided to remove excess heat of neutralization. By way of example, the spent caustic wastewater stream may be cooled to about ambient temperature (e.g., 30–100° F.) prior to initiating the oxidation reaction.

An optional acid oil separator SP250 can be provided. Acid gases and acid oils separated by the separator SP250 at the prevailing pH can be delivered to suitable storage receptacles 280 or otherwise recovered. The acid oil separator SP250 can be omitted, for example if acid oils are absent or if in a particular application it is preferred that acid oils be treated by oxidation together with the remaining spent caustic components.

A second, fine pH adjustment preferably is employed to optimize oxidation conditions. As illustrated in the Figure, sulfuric acid can be pumped from drum D250 through line 4 and mixed with the spent caustic stream. As with the first pH adjustment, the particular pH to which the wastewater stream is adjusted during the second, fine pH adjustment will depend on such factors as the composition of the spent caustic stream and the objectives of the pretreatment, e.g., whether an acid oil separator is used, etc. By way of example, when an acid oil separator is not used, pH typically is adjusted to about 6.0–7.0 during the second, fine pH adjustment.

A supply 20 of ferrous sulfate catalyst is fed through line 6 into contact with the spent caustic wastewater stream. As will be apparent to persons skilled in the art, the feed rate of the catalyst will depend on such factors as the amount of oxidizer used. Appropriate amounts of catalyst can be determined with the aid of no more than routine experimentation. An optional catalyst conditioning station SP210 allows for expansion of the material, as catalyst addition often creates foaming. The catalyst conditioning station SP210 also provides additional residence time (typically about 1–5 minutes) prior to adding the oxidizer.

A concentrated (typically up to about 50 wt %) supply 10 of oxidizer is fed though line 7 and combined with process water 60 in DS100 to prepare the oxidizer (typically at a concentration of about 2 to about 15 wt %) and fed in line 15 into the spent caustic 5. An appropriate amount (flowrate) of oxidizer can be determined, for example, by analyzing the wastewater stream prior to treatment, and with the aid of no more than routine experimentation. As discussed more fully below, the flowrate of oxidizer (in addition to other process parameters) also can be automatically adjusted during operation (PLC4), for example in response to changes in the influent composition, reaction conditions, and the like.

In the embodiment illustrated in the Figure, the spent caustic wastewater stream is chemically oxidized in a primary plug flow reactor SP230 and a secondary plug flow reactor SP231. The two-reactor system shown in the Figure is merely illustrative of a preferred embodiment of the invention. It should be understood that the number and/or arrangement of the reactors may vary and can be suitably selected by those skilled in the art to accommodate the requirements of a particular treatment. It is contemplated that a single plug flow reactor can be used for the pretreatment of many wastewater streams, e.g., those whose components are more easily oxidizable, such as sulfides.

As shown schematically in the Figure, each plug flow reactor SP230, SP231 can be constructed to form several loops, e.g., to provide a desired residence time. Each plug flow reactor SP230, SP231 includes a jacket (illustrated by dashed lines 125) for circulating cooling water to remove excess heat of reaction. When using hydrogen peroxide as oxidizer, excessively high temperatures (e.g., above about 150° F.) can cause the peroxide to decompose, and should be avoided. In a preferred practice of the invention, the reactor temperatures during normal operation most often range from about 110° F. to about 120° F.

In the two-reactor embodiment illustrated in the Figure, the first reactor SP230 typically has a shorter length, and a shorter residence time during which precursors that are more easily oxidized react with the oxidizer. The second reactor SP231 typically has a longer length, and a longer residence time during which the remaining precursors are oxidized. In the primary reactor SP230, most sulfidic precursors are oxidized. The reaction mixture preferably has a retention time of at least 15 minutes in the primary reactor SP230, most often from about 15 to 20 minutes. In the secondary reactor SP231, the reaction mixture preferably has a retention time of from about 45 to 90 minutes, most often about 60 minutes. In the secondary reactor, remaining precursors, such as phenols and cresols, are oxidized.

Being a closed reaction system, pressures above atmospheric normally are encountered, often up to about 100 psi, usually about 30 to 90 psi. A pressure-reducing drum (degasser) D240 preferably is employed to reduce the pressure of the reaction product stream, e.g., to atmospheric pressure. Entrained gases are released and separately recovered via line 16 to a suitable receiving source 70. Under normal conditions, carbon dioxide gas will be present in the vent gases. Examples of other gases that may be present include oxygen and hydrogen sulfide. Optionally, a scrubbing tower 75 may be integrated with the apparatus for treating vent gases.

The degassed reaction product can be pumped through line 13. Fresh caustic 80, e.g., 10–50 wt % aqueous NaOH, can be fed through line 14 and mixed with the product stream, as needed. The pH of the reaction product can be adjusted, for example, to about 6.5 to 10 by addition of fresh caustic to meet compatibility requirements of the receiving wastewater treatment plant or other downstream processing.

The embodiment shown in the Figure illustrates a preferred order and timing for adding the various materials (e.g., pH adjusting medium, catalyst, oxidizer, etc.) to the wastewater stream. A "predetermined point of addition," as used herein, refers to a particular location of the apparatus at which a material is added into the wastewater stream. The predetermined points of addition define not only the order that the materials are added, but also the timing of addition. For example, a particular material may be added at a point concurrent with or shortly downstream of a previous point of addition. Alternatively, the material may be added at a point further downstream of a previous point of addition, e.g., to permit mixing, cooling, expansion, or other changes in physical or chemical properties of the stream.

In the treatment of some wastewater streams having high loadings of components that are susceptible to coming out of solution into the gas phase, such as sulfidic precursors, it may be desirable to add the various materials (e.g., pH adjusting medium, catalyst, oxidizer, etc.) to the wastewater stream under low shear conditions. The term "low shear conditions," as used herein, refers to mixing conditions under which shear or turbulence is minimized, so that the risk of formation of gas bubbles is significantly reduced. Such mixing can be accomplished, for example, simply by flowing the materials to be mixed through a pipe of sufficient length to obtain a desired level of mixing. It should be noted, however, that in the treatment of many streams, reaction pressure alone is sufficient to prevent the components from coming out of solution and therefore it is not necessary to minimize shear.

According to another preferred embodiment of the invention, a catalyst is fed into the wastewater stream at a first predetermined point of addition and mixed with the wastewater stream. The first predetermined point of addition can be, for example, downstream of one or more pH adjustments as in the embodiment illustrated in the Figure.

The chemical oxidizer is fed into the wastewater stream at a second predetermined point of addition and mixed with the wastewater stream. The oxidizer can be combined at a point downstream of the point at which the catalyst is added, as in the embodiment illustrated in the Figure. It is contemplated that, in some cases, it may be advantageous to alternatively add the oxidizer upstream of the point of addition of the catalyst, e.g., if doing so reduces chemical costs, cooling requirements, or the like. The predetermined point of addition of the oxidizer can be upstream of, downstream of, or concomitant with catalyst addition.

One or more pH adjustments, as previously discussed, can be made at predetermined points of addition. The points of addition for pH adjustment(s) also can be suitably selected to define a desired order and timing of addition. For example, each of the pH adjustments can be made prior to addition of the other materials, as in the embodiment illustrated in the Figure. Alternatively, pH adjustment(s) can be made at other point(s) of addition in the process if more desirable for a particular application.

As shown schematically in the Figure, the apparatus preferably is constructed as a modular unit. This configuration permits the majority of the apparatus to be pre-constructed, significantly reducing the amount of time needed to install a unit at a refinery or other facility. The apparatus comprises a frame, which can have a length of about 40 feet to facilitate transportation, for example by tractor trailer or railcar. The components of the pretreatment apparatus preferably are self-contained within the frame, and individual modules can be installed to tailor the apparatus for a particular application.

The modular unit contains means 30 for flowing a wastewater stream and means DS100 for feeding a chemical oxidizer into the wastewater stream. The term "feeding means" and similar terms used herein can be simply a line for flowing a material (e.g., oxidizer) from an associated or external storage source, and optionally can include one or more valves and/or a pump for controlling flow. The unit includes one or more plug flow reactors SP230, SP231 suitable for reacting oxidizable compound(s) in the wastewater stream with the chemical oxidizer. Optionally, the unit includes a degasser D240 for separating vent gases from the reaction product stream.

The apparatus optionally includes one or more modules, which can be added to the apparatus, as needed, for particular applications. One example of a module is means D250 for feeding a pH-adjusting medium into the wastewater stream at one or more points of addition. Another module that can be included is a scrubber 75 for treating vent gases, such as those separated from the reaction product stream by the degasser D240. Another module that can be included is means 20 for feeding a catalyst into the wastewater stream. Another module that can be included is an acid oil separator SP250 for separating acid gas and acid oils 280 from the wastewater stream. Additional modules also can be included if needed or desired for treating a particular wastewater stream.

The apparatus preferably includes control means, such as a Process Logic Controller (PLC) or a personal computer (PC), for monitoring process conditions, e.g., conductivity, pH, temperature, sulfide ISE (ion selective electrode), oxidation-reduction potential (ORP), and the like at one or more locations in the apparatus. In addition, the vent gases 70 preferably are monitored, for example to detect whether oxygen, hydrogen sulfide, etc. is present. It has been found that the conditions most useful for monitoring the progress of the reaction include ORP and pH, followed by sulfide ISE and temperature (PLC1, PLC2, PLC3). Initially, the raw spent caustic solution typically has an ORP of about −800 to about −1200 mV. As the stream begins to react in the primary reactor SP230, ORP typically is in the range of from about −500 to about +500 mV. The process effluent 190 typically has an ORP in the range of from about +50 to about +300.

Typically, the aforementioned conditions are monitored at the head of the process, e.g., the inflowing wastewater stream, at a point between the primary reactor SP230 and the secondary reactor SP231, and at the effluent 13. In response to detecting these conditions, process parameters such as pH, temperature, pressure, oxidizer flowrate, and catalyst flowrate can be automatically adjusted, as needed, to avoid or minimize the need for operation intervention. If one or more parameters significantly deviate from acceptable conditions, the control means can trigger an automatic shut down.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A continuous process of pretreating a wastewater stream by chemical oxidation in
   a plug flow reactor, the process comprising:
   flowing a wastewater stream containing at least one compound susceptible to treatment by chemical oxidation;
   feeding a catalyst into said wastewater stream;
   feeding a chemical oxidizer into said wastewater stream, and mixing said wastewater stream and said chemical oxidizer to form a reactive mixture; and
   flowing said reactive mixture through a plug flow reactor under conditions sufficient to react said compound susceptible to treatment by chemical oxidation with said chemical oxidizer.

2. The process of claim 1 wherein said wastewater stream comprises a spent caustic stream.

3. The process of claim 2 wherein said at least one compound susceptible to treatment by chemical oxidation is selected from the group consisting of sulfidic, phenolic, cresylic, and naphthenic compounds, and combinations thereof.

4. The process of claim 1 further comprising adjusting the pH of the wastewater stream.

5. The process of claim 1 wherein said catalyst comprises at least one of copper, nickel, titanium, vanadium, molybdenum, cobalt, aluminum, tungsten, iron, manganese, and silicon.

6. The process of claim 5 wherein said catalyst comprises ferrous sulfate optionally complexed with ethylenediaminetetraacetic acid.

7. The process of claim 1 wherein said chemical oxidizer is selected from the group consisting of hydrogen peroxide, potassium permanganate, ozone, oxygen, chlorine dioxide, Caro's Acid, chlorine, sodium hypochlorite, and combinations thereof.

8. The process of claim 7 wherein said chemical oxidizer comprises hydrogen peroxide.

9. A continuous process of pretreating a wastewater stream by chemical oxidation, the process comprising:
   flowing a wastewater stream containing at least one compound susceptible to treatment by chemical oxidation;
   feeding a catalyst into said wastewater stream at a first predetermined point of addition, and mixing said catalyst and said wastewater stream;
   feeding a chemical oxidizer into said wastewater stream at a second predetermined point of addition downstream of said first predetermined point of addition, and mixing said chemical oxidizer and said wastewater stream; and
   reacting said compound susceptible to treatment by chemical oxidation with said chemical oxidizer.

10. The process of claim 9 wherein said wastewater stream is a spent caustic stream, and wherein said at least one compound susceptible to treatment by chemical oxidation is selected from the group consisting of sulfidic, phenolic, cresylic, and naphthenic compounds, and combinations thereof.

11. The process of claim 9 wherein said catalyst comprises at least one of copper, nickel, titanium, vanadium, molybdenum, cobalt, aluminum, tungsten, iron, manganese, and silicon.

12. The process of claim 11 wherein said catalyst comprises ferrous sulfate optionally complexed with ethylenediaminetetraacetic acid.

13. The process of claim 10 further comprising adjusting the pH of the wastewater stream.

14. The process of claim 9 wherein said chemical oxidizer is selected from the group consisting of hydrogen peroxide, potassium permanganate, ozone, oxygen, chlorine dioxide, Caro's Acid, chlorine, sodium hypochlorite, and combinations thereof.

15. The process of claim 14 wherein said chemical oxidizer comprises hydrogen peroxide.

16. Apparatus for continuously pretreating a wastewater stream by chemical oxidation in a plug flow reactor, the apparatus comprising a modular unit containing:
- means for flowing a wastewater stream containing at least one compound susceptible to treatment by chemical oxidation;
- means for feeding a chemical oxidizer into said wastewater stream;
- a plug flow reactor for reacting said compound susceptible to treatment by chemical oxidation with said chemical oxidizer; and
- a jacket surrounding the plug flow reactor for circulating a heat transfer fluid.

17. A continuous process of pretreating a spent caustic wastewater stream by chemical oxidation in a plug flow reactor, the process comprising:
- flowing a spent caustic wastewater stream containing at least one compound susceptible to treatment by chemical oxidation selected from the group consisting of sulfidic, phenolic, cresylic, and naphthenic compounds;
- adjusting the pH of said spent caustic wastewater stream by adding a pH adjusting medium to said spent caustic wastewater stream;
- feeding a catalyst into said spent caustic wastewater stream at a first predetermined point of addition, and mixing said catalyst and said spent caustic wastewater stream, wherein said catalyst comprises one or more compounds containing iron, manganese, or silicon;
- feeding an oxidizer comprising hydrogen peroxide into said spent caustic wastewater stream at a second predetermined point of addition, and mixing said oxidizer and said spent caustic wastewater stream; and
- flowing said spent caustic wastewater stream containing said catalyst and said oxidizer through a plug flow reactor under conditions sufficient to react said at least one compound susceptible to treatment by chemical oxidation with said hydrogen peroxide.

18. Apparatus for continuously pretreating a wastewater stream by chemical oxidation in a plug flow reactor, the apparatus comprising a modular unit containing:
- means for flowing a wastewater stream containing at least one compound susceptible to treatment by chemical oxidation;
- means for feeding a catalyst into said wastewater stream;
- means for feeding a chemical oxidizer into said wastewater stream; and
- a plug flow reactor for reacting said compound susceptible to treatment by chemical oxidation with said chemical oxidizer.

19. The apparatus of claim 18 further comprising at least one module selected from the group consisting of:
- (a) means for feeding a pH adjusting medium into said wastewater stream at one or more points of addition;
- (b) a scrubber for treating vent gases present in said wastewater stream; and
- (c) means for separating acid gas and acid oil from said wastewater stream.

20. The apparatus of claim 18 further comprising a catalyst conditioning station for expanding the catalyst-containing wastewater stream.

21. Apparatus for continuously pretreating a wastewater stream by chemical oxidation in a plug flow reactor, the apparatus comprising a modular unit containing:
- means for flowing a wastewater stream containing at least one compound susceptible to treatment by chemical oxidation;
- means for feeding a chemical oxidizer into said wastewater stream;
- a plug flow reactor for reacting said compound susceptible to treatment by chemical oxidation with said chemical oxidizer; and
- at least one module selected from the group consisting of:
  - (a) means for feeding a pH adjusting medium into said wastewater stream at one or more points of addition;
  - (b) a scrubber for treating vent gases present in said wastewater stream;
  - (c) means for feeding a catalyst into said wastewater stream; and
  - (d) means for separating acid gas and acid oil from said wastewater stream;
- the apparatus further comprising:
  - means for determining at least one of pH, temperature, sulfide ion concentration, and oxidation-reduction potential of said wastewater stream; and
  - means responsive to said determining means for adjusting at least one of pH, temperature, pressure, chemical oxidizer flowrate, and catalyst flowrate.

22. The apparatus of claim 21 wherein said determining means comprises sensing means located at a plurality of locations.

* * * * *

UNITED STATES PATENT AND TRADEMARK OFFICE
CERTIFICATE OF CORRECTION

PATENT NO.    : 6,576,144 B1                                                Page 1 of 1
DATED         : June 10, 2003
INVENTOR(S)   : Mark K. Vineyard It is certified that error appears in the above-identified patent and that said Letters Patent is hereby corrected as shown below:

<u>Column 10,</u>
Line 59, "10" has been replaced with -- 9 --.

Signed and Sealed this

Eighteenth Day of November, 2003

JAMES E. ROGAN
*Director of the United States Patent and Trademark Office*